United States Patent [19]

Pegourie

[11] 4,229,984
[45] Oct. 28, 1980

[54] STEP BY STEP MOTOR AND/OR BRAKE DEVICE

[75] Inventor: Jean-Pierre Pègourié, Montpellier, France

[73] Assignee: Agence Nationale de Valorisation de la Recherche-Anvar, France

[21] Appl. No.: 929,014

[22] Filed: Jul. 28, 1978

[30] Foreign Application Priority Data

Aug. 2, 1977 [FR] France .................. 77 23702

[51] Int. Cl.² ............................................. F16D 27/10
[52] U.S. Cl. ................................................. 74/125.5
[58] Field of Search ..................... 74/125.5, 322, 323, 74/324

[56] References Cited

U.S. PATENT DOCUMENTS 3,881,367  5/1975  Call .................... 74/125.5
4,042,036  8/1977  Smith et al. ........... 74/125.5

FOREIGN PATENT DOCUMENTS 1075850  2/1960  Fed. Rep. of Germany .......... 74/125.5

Primary Examiner—Patrick D. Lawson
Attorney, Agent, or Firm—Craig & Antonelli

[57] ABSTRACT

The invention relates to a step by step motor and/or brake device through controlled translation, comprising two assemblies arranged substantially coaxially about the same shaft, one of them being slidable along said shaft, and the other assembly being rotatable about said shaft.

The device according to the invention may be used in mechanical, pneumatic or electrical equipments, in automatic arrangements, in servo-controls, as modifiable drives, step by step motors, step by step brakes.

28 Claims, 23 Drawing Figures

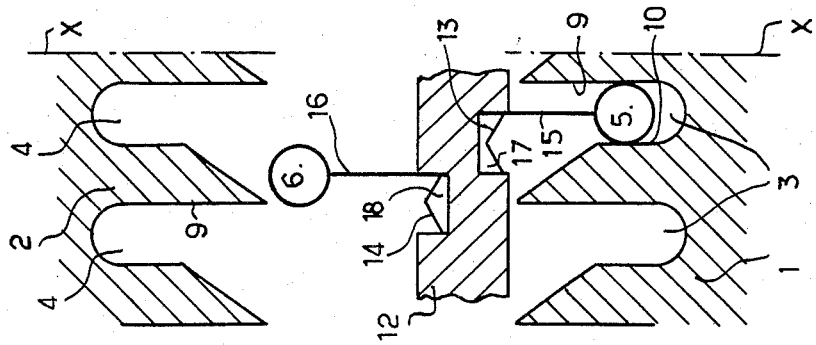
Fig. 15
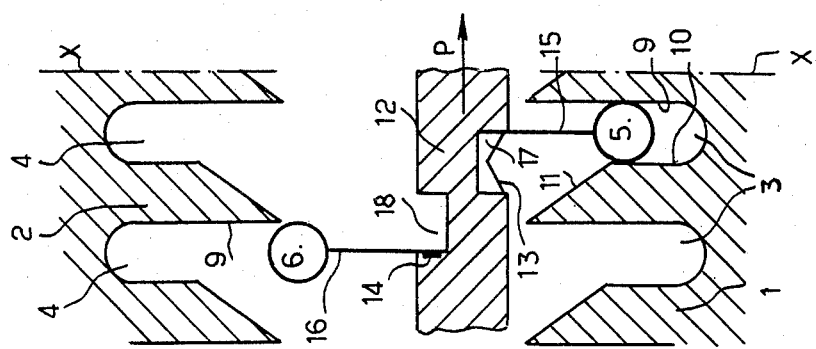
Fig. 14
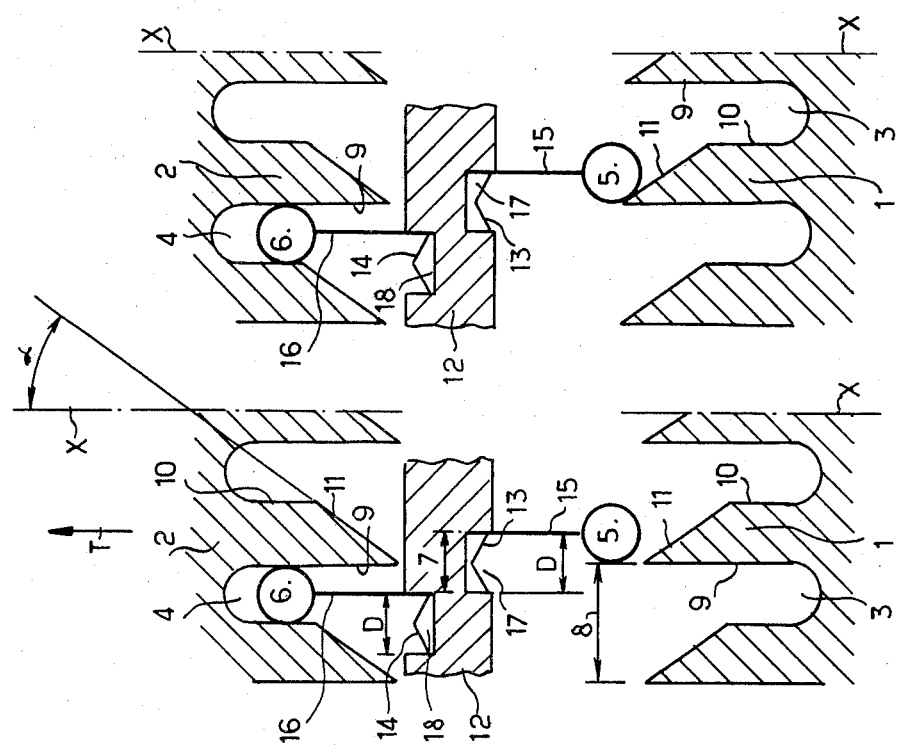
Fig. 13
Fig. 12

STEP BY STEP MOTOR AND/OR BRAKE DEVICE

FIELD OF THE INVENTION

The invention relates to a step by step motor and/or brake device, i.e. to a device which responds to a movement of controlled translation, by providing or by allowing a rotational movement; more precisely, in the device according to the present invention, said controlled translation is one of a series of reciprocating movements, a movement which produces or allows a fraction of rotation which is discontinuous. In particular, but not exclusively, the present invention applies to a step by step motor or brake, i.e. to a motor which responds, to an order which produces therein a complete translation (outward or inward travel), by providing or by allowing a partial rotation, of invariable magnitude and invariable direction.

OBJECTS AND SUMMARY OF THE INVENTION

The present invention has then as an aim to provide a rotational device by controlled translation, which satisfies the requirements of practice, particularly in that it is reliable in operation, in that it may be constructed without requiring a great accuracy in the manufacture of its component parts, and in that the application of the movement of translation which controls it reliably produces or allows the partial rotation of determined magnitude and determined direction.

The present invention has as an object a step by step motor and/or brake device by controlled translation, characterized in that it comprises essentially two assemblies disposed substantially coaxially about the same shaft, one or the other of the two assemblies may slide reciprocally under the action of said control along said shaft and the other assembly is secured against sliding along said shaft, one or the other of the two assemblies may rotate about said shaft while providing the desired rotation and the other assembly is secured against rotation about said shaft, one or the other of the two assemblies comprises at least one roller whose axis is perpendicular to said shaft, and the other assembly comprises at least an annular ring, in which at least one face perpendicular to said shaft carries at least one cavity, of which the surface is substantially the envelop of said roller whose base would roll over a cylindrical line forming a V-shaped hollow, symmetrical or asymmetrical, said controlled translation bringing into mutual contact said cavity and said roller, then causing said roller to roll over said cavity to the bottom of the V, which provides said desired rotation.

It should be noted that said roller or rollers may by cylindrical, or may be frusto-conical (with the apex of the cone on said shaft).

According to one embodiment of the device which forms the subject-matter of the present invention, the assembly comprising at least one annular ring is slidingly mounted along the shaft, and the assembly comprising at least one roller is mounted rotatively about the shaft; the sliding assembly comprises two annular rings, whose opposing faces each carry a plurality of cavities, identical and consecutive; the V of the cylindrical line of each cavity is completely asymmetrical, with one leg parallel to said shaft and with the other leg comprising at least one external part forming with said shaft an angle less than about 60°, and preferably equal to about 30° and possibly comprising an internal part parallel to said shaft; the rotating assembly comprises preferably two sets of identical and radially equidistant rollers, the number of which per set is a sub-multiple of the number of cavities in an annular ring or is equal thereto (the reverse structure is of course possible, with a few spaced and equidistant cavities or even a single cavity per annular ring, and with a plurality of rollers spaced apart by a cavity); an angular stagger of half a cavity is provided between the two annular rings, or between the two sets of rollers, or a part between the two annular rings and the complement between the two sets. This device may further comprise, according to the present invention, on the one hand input means for the controlled translation and, on the other hand, output means for the rotation of the roller assembly: thus there is obtained a step by step motor and/or brake device.

Another embodiment of the device of the present invention concerns the mounting of the rollers on the rotating assembly: instead of a fixed mounting, this mounting comprises, for each of the two sets of rollers, a spring, which pushes the rollers of this set to a distance selected with respect to the rotating assembly and in the direction of rotation of the rotating assembly, but which allows the rollers of this set to draw closer by about half a step to the rotating assembly (when these rollers bear on the legs of the V parallel to the shaft).

As described in detail further on, the device of the present invention prevents any inopportune operation under the action of a driving torque tending to rotate the rotating assembly forwards or backwards. However, a driving torque tending to rotate the rotating assembly forwards may, by surpassing the spring of one set of rollers, cause, in the rest position, the rotating assembly to advance by half a step. If it is desired to prevent this advance, it is sufficient, according to the present invention, to provide a free wheel without clearance on the output shaft.

The step by step motor of the present invention may be used as a step by step brake. In more detail, when a driving torque is applied to the rotating assembly, it causes it to rotate by half a step for each sliding movement of the sliding assembly (on condition of course that said driving torque surpasses said spring of the set of rollers); it will be noted that, as described in detail further on, by going over from operation as a step by step motor to operation as a step by step brake, the reversal of the torque of the rotating assembly causes the reversal of its direction of rotation, or else requires the reversal of the springs of the sets of rollers.

Accordingly, yet another arrangement according to the present invention consists in making the two said springs of the sets of rollers reversible under control: the same motor is then capable of operating as a step by step motor or as a step by step brake.

The said input means for the translation may be a pair of push-rods, and then the device is actuated manually or mechanically, or a pair of jacks, for example pneumatic, and then there is obtained a pneumatic step by step device, or a pair of solenoids, and then there is obtained a step by step electrical device. Said output means for the rotation obtained may be a shaft driven by irreversible gears from the roller assembly, or two such shafts rotating in opposite directions, or two pairs of such shafts with gear ratios possibly different from one pair to the other.

Apart from the arrangements which precede, the invention comprises still other arrangements, which will appear from the following description.

The invention relates more particularly to devices for rotation by controlled translation according to the arrangements which precede, as well as the means for the construction of these devices and the installations in which these devices are included, particularly pneumatic installations, automatic or servo-controlled, for example.

BRIEF DESCRIPTION OF THE DRAWINGS

The invention will be better understood with the complement of description which follows which refers to the accompanying drawings in which:

FIGS. 12, 13, 14 and 15 are four developed figures of the cylindrical line, with a plurality of cavities and with one roller of each set, in four successive operational phases, which illustrate the principle of a step by step device according to the present invention;

It will be readily understood however that these drawings and the corresponding descriptive parts are given solely by way of an illustration of the subject of the invention, of which they are in no wise to be considered a limitation.

DESCRIPTION OF THE PREFERRED EMBODIMENTS

Figure 1:
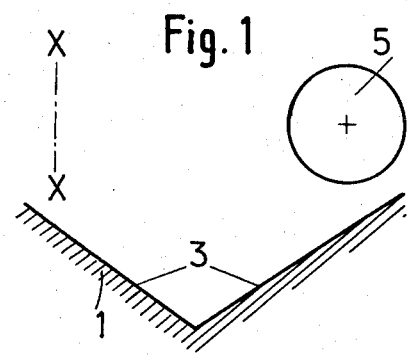
FIGS. 1, 2 and 3 are three developed figures of the cylindrical line, with a single cavity and a single roller, in three successive operational phases, which illustrate the principle of the invention and its above described embodiment.
Figure 2:
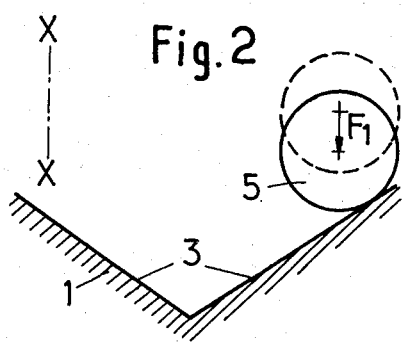
Figure 3:
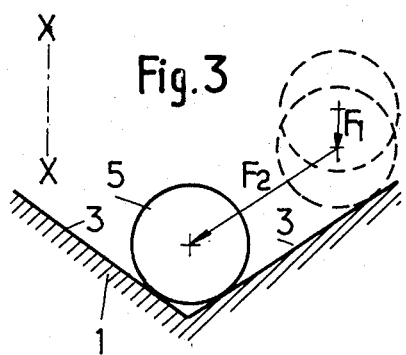

FIGS. 1, 2 and 3 are three figures, in three successive operational phases, of the cylindrical line, assumed split along a generatrix parallel to the general axis XX and developed flat, of the annular ring 1, with a V-shaped cavity 3 which may be symmetrical as shown and which cooperates with a roller 5. Of course, only the relative movements of the annular ring 1 and roller 5 count, and it is only for simplicity's sake that the annular ring 1 is here assumed fixed. In FIG. 1, the roller 5 is outside cavity 3. If the shaft of roller 5 is pressed down (or pulled), roller 5 descends (arrow F1) and contacts cavity 3 (FIG. 2), then roller 5 rolls over one leg of the V of cavity 3 and stops at the bottom of cavity 3 (FIG. 3): thus, the shaft carrying roller 5 has been brought into a predetermined angular position which may be adjusted by adjusting the angular position of annular ring 1. It is evident that by employing several cavities 3 in annular ring 1, and/or two annular rings 1 symmetrically positioned but staggered, a plurality of such preadjusted positions may be obtained. It is also evident that the shaft carrying roller 5 could be arranged not to slide on itself and that its predetermined angular position or positions would then be obtained by pulling (or pushing) the annular ring or annular rings 1 parallel to the general axis XX. Such structures permit the free rotation of a shaft and its positioning in predetermined angular positions.

Figure 4:
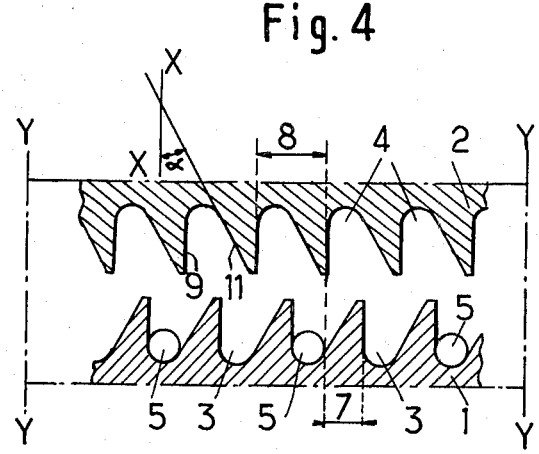
FIGS. 4, 5 and 6 are three developed figures of the cylindrical line, with a plurality of cavities and a plurality of rollers, in three successive operational phases, which illustrate the principle of another embodiment of the invention, defined above.
Figure 5:
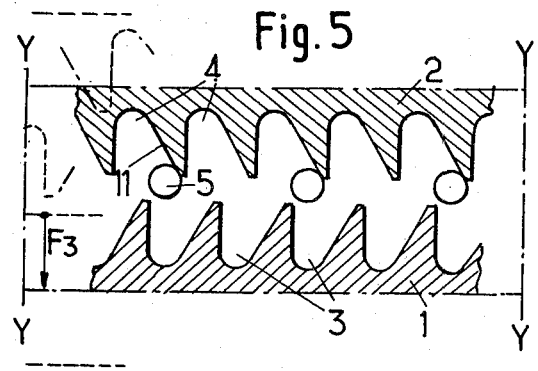
Figure 6:
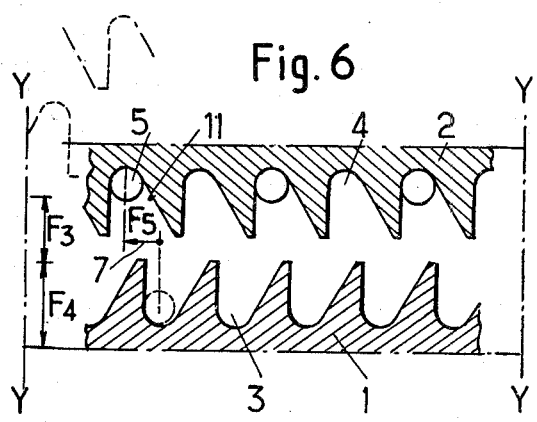

FIGS. 4, 5 and 6 are similar to the preceding FIGS. 1, 2 and 3 and concern another embodiment, defined above. The assembly sliding reciprocally along the shaft having an axis XX comprises two annular rings 1 and 2, which are each provided with a plurality of cavities 3 and 4, these cavities being identical to each other and consecutive in each annular ring, the two annular rings 1 and 2 being symmetrical and being, in relation to each other, staggered angularly by the half 7 of a cavity width or step 8. Cavities 3 and 4 are here in the shape of a completely asymmetrical V, i.e. with one leg or face 9 parallel to the general axis XX and with the other leg or face 11 forming an angle $\alpha$ (FIG. 4) with the general axis XX; this angle $\alpha$ is less than about 60°; it is preferably equal to about 30°. The frusto-conical rollers 5 are here equal in number to half the number of cavities 3 of annular ring 1 (or 4 of annular ring 2), but they could be equal in number or in another sub-multiple number or equal to 1, as already indicated and obvious, as well as the reverse arrangement of these two numbers. The operation is equivalent to that already described with reference to FIGS. 1, 2 and 3; with rollers 5 at the bottom of the cavities 3 of the annular ring 1 (FIG. 4), a downwards translation of annular rings 1 and 2 (arrow F3 of FIG. 5) brings faces 11 of cavities 4 of annular ring 2 in contact with rollers 5, then (arrow F4 of FIG. 6) causes these rollers 5 to roll over faces 11, which produces the desired rotation, by half a step 7 shown by arrow F5. When the reverse movement occurs (upwards) of annular rings 1 and 2, rollers 5 will still rotate half a step 7, but always in the direction of arrow F5. Thus it can be seen that the invention provides indeed a device responding to a controlled translation (equal to F3+F4 or opposed to F3+F4) by a rotation which is always equal (to half a step 7) and in the same direction (shown by arrow F5), i.e. a step by step device.

Such a step by step device according to the invention is provided with input means for the controlled translation and output means for the rotation obtained.

Figure 7:
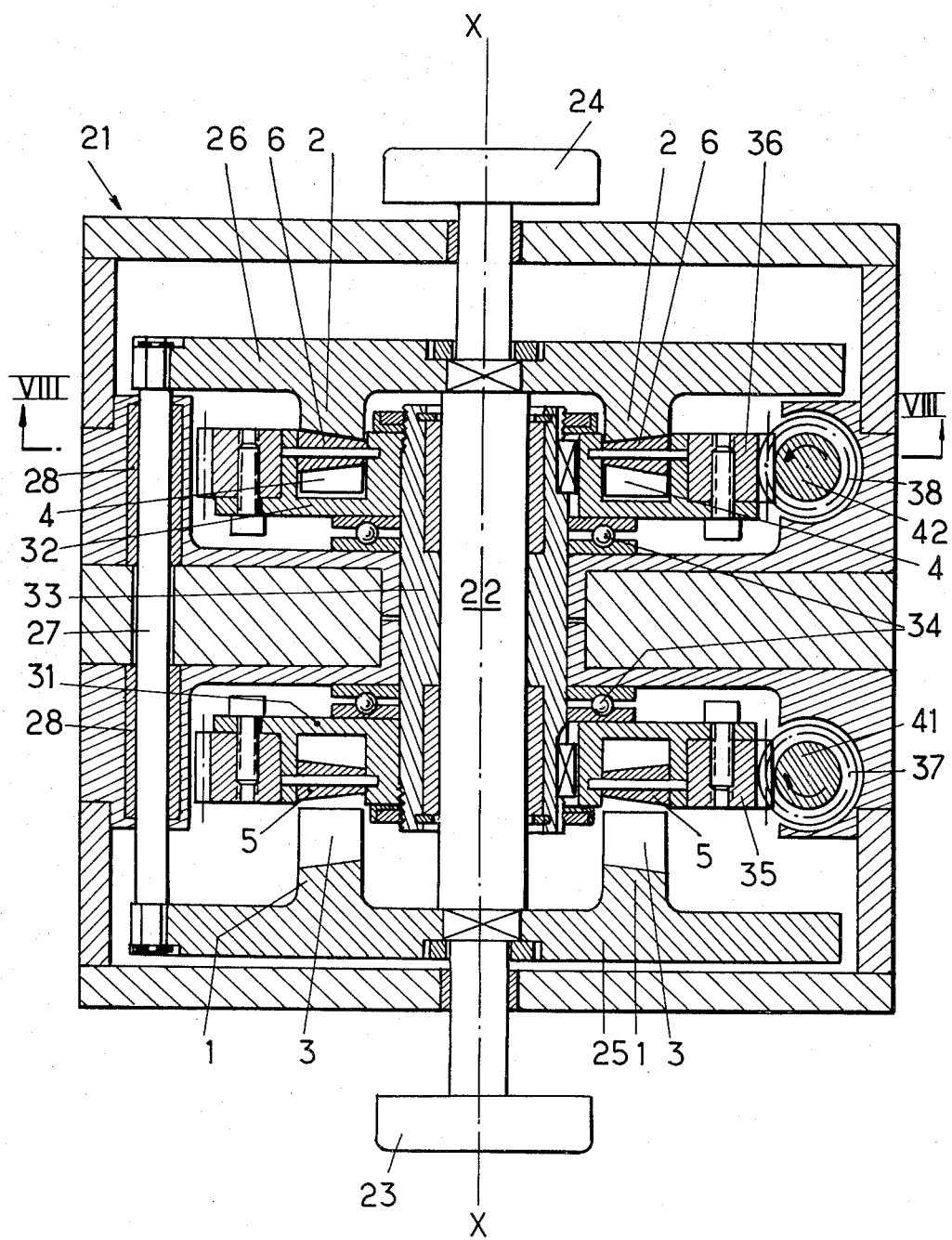
FIG. 7 is a view in axial section, along the line VII—VII of FIG. 8, of a mechanically controlled step by step device according to another embodiment of the invention, defined above.
Figure 8:
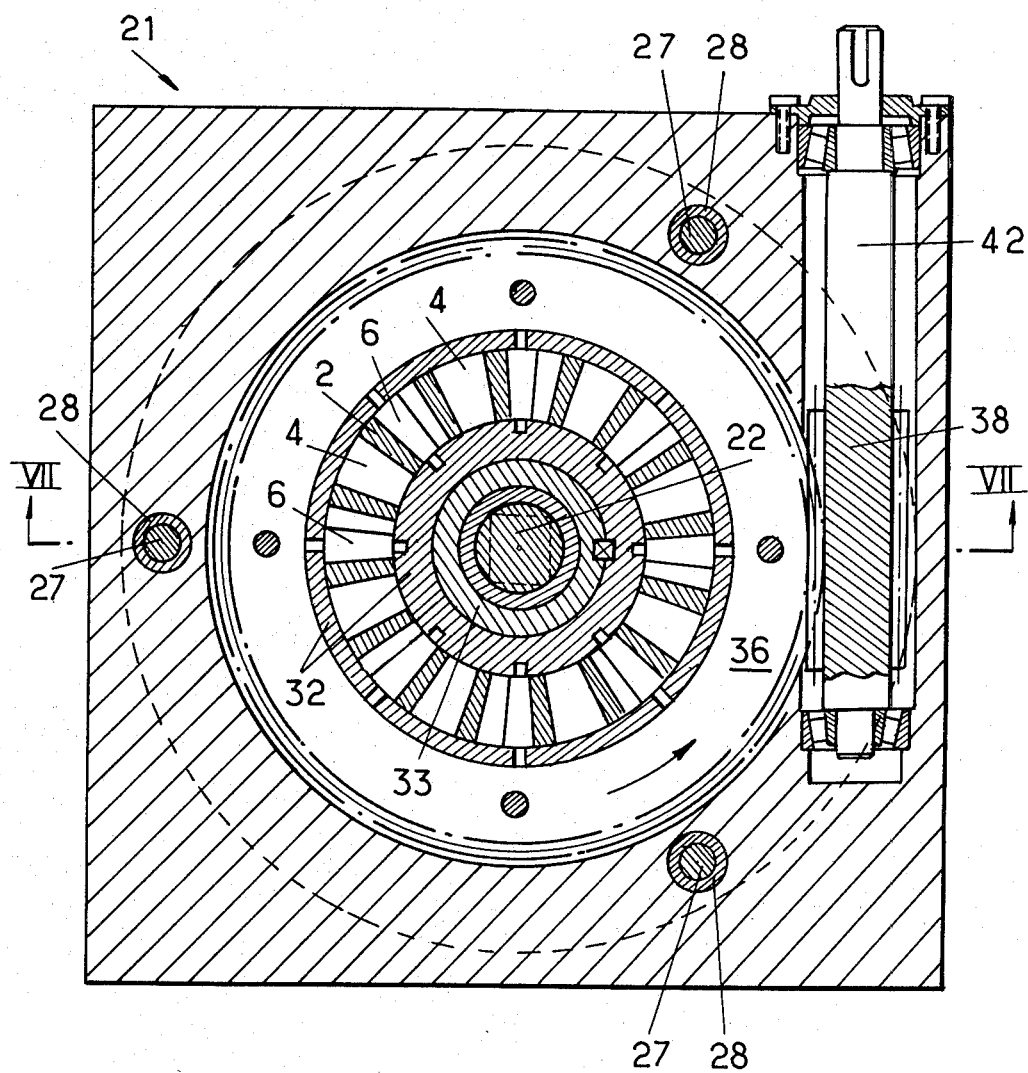
FIG. 8 is a cross-sectional view, along line VIII—VIII of FIG. 7.

FIGS. 7 and 8 show, in axial and cross sections, such a step by step motor, with mechanical control, in accordance with the embodiment shown in FIGS. 4, 5 and 6 of the present invention. We find there again the two annular rings 1 and 2 and their cavities 3 and 4, the frusto-conical rollers being however symmetrically divided into two at 5 and 6 (FIG. 7). Furthermore, in a casing 21, with a square-based cylindrical shape about axis XX, there slides shaft 22, having axis XX, which carries two outer push-rods 23 and 24 and two discs 25 and 26, carrying respectively annular rings 1 and 2; the unit formed by 1, 2, 22, 23, 24, 25 and 26 forms the sliding assembly; it is guided and secured against rotation for example by pieces integral with the casing (not shown) or by means of three struts 27 connecting discs 25 and 26 and sliding in ball sockets 28, or by an equivalent means. The rotating assembly comprises two discs 31 and 32, interconnected by a sleeve 33, surrounding shaft 22 and rotating in casing 21 on ball thrust-bearings 34; discs 31 and 32, which carry respectively the frusto-conical rollers 5 and 6, each carry furthermore a removable annular ring, 35 and 36, which has the form of an irreversible screw and each of which meshes with a gear wheel respectively 37 and 38, fixed on an output shaft, 41 and 42 (FIG. 8): this motor is thus provided with two output shafts, rotating step by step in opposite directions, which is often desirable or even necessary.

Figure 9:
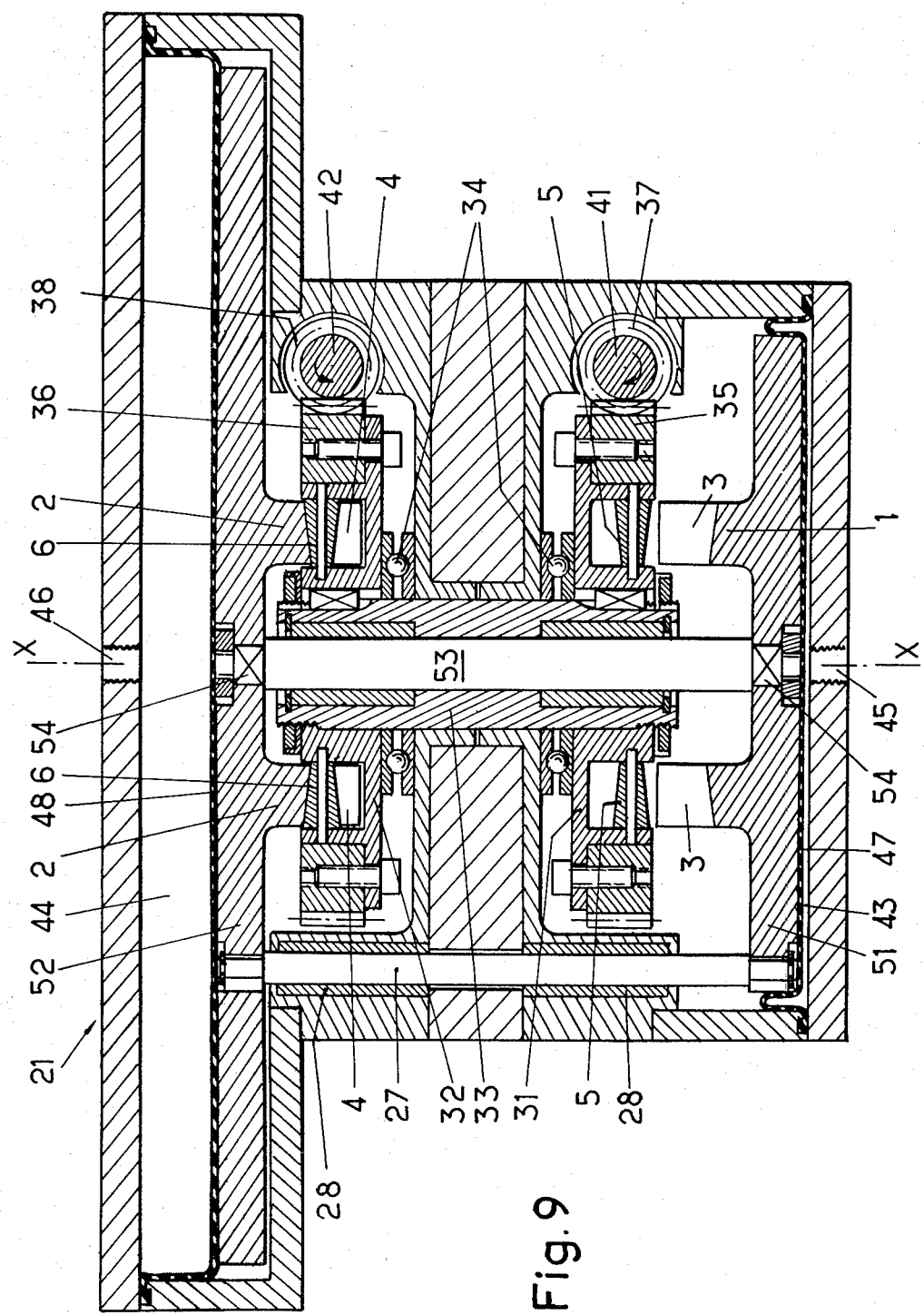
FIG. 9, similar to FIG. 7, is a view in axial section of two variations, of a step by step pneumatic device according to another embodiment of the invention, defined above.

FIG. 9 and the same FIG. 8 show, in axial and cross sections, a step by step motor, with pneumatic control, in accordance with the embodiment shown in FIGS. 4, 5 and 6, of the present invention. We find there again the two annular rings 1 and 2 with their cavities 3 and 4, the frusto-conical rollers 5 and 6, the struts 27 with their sockets 28 and the rotating assembly 31, 32, 33, 34, 35, 36 with its outputs 37, 38, 41, 42. It should be pointed out here that these two outputs 37-38, 41-42 rotate in opposite directions with the same ratio. Casing 21 forms at its ends two pneumatic cylinders 43 and 44, with threaded connections 45 and 46, with two resilient membranes 47 and 48, actuating alternatively two pistons 51 and 52. The two pistons 51 and 52, which carry respectively annular rings 1 and 2, are firmly interconnected by shaft 53, having axis XX, and squares 54, and by said struts 27.

As shown in the left hand half of FIG. 9, the size of the pneumatic part may be increased for questions of choice and/or expediency: casing 21 is widened at both its ends to house pistons 51 and 52 of greater diameter, as well of course as resilient membranes 47 and 48, this diameter being freely chosen, which allows a smaller supply pressure to be used and/or an increased force of translation to be obtained, thus giving at the outputs an increased rotational torque.

Figure 10:
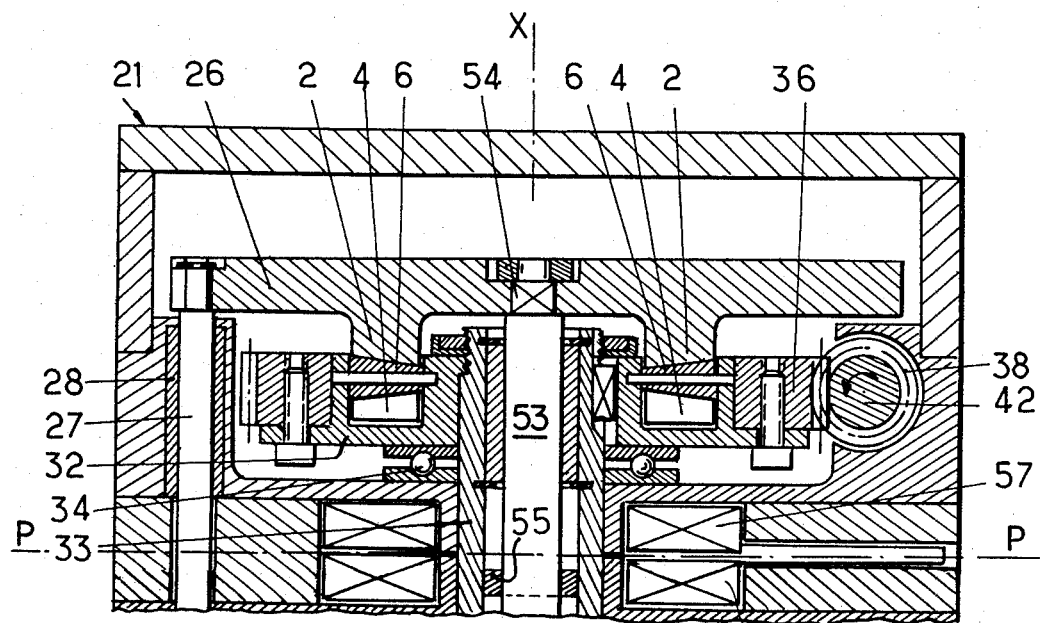
FIG. 10, similar to FIG. 7, is a view in axial section of a step by step electrical device according to the present invention.

FIG. 10 shows, in axial section, a step by step electrical motor according to the present invention. Shaft 53 carries a ring 55, made of soft iron, which is attracted alternatively by one and the other of two solenoids 56 and 57 disposed symmetrically in casing 21, sleeve 33 being made from a non-magnetic metal. Of course, this electrical motor system 55, 56, 57 may be replaced by any other electrical motor system known.

Figure 11:
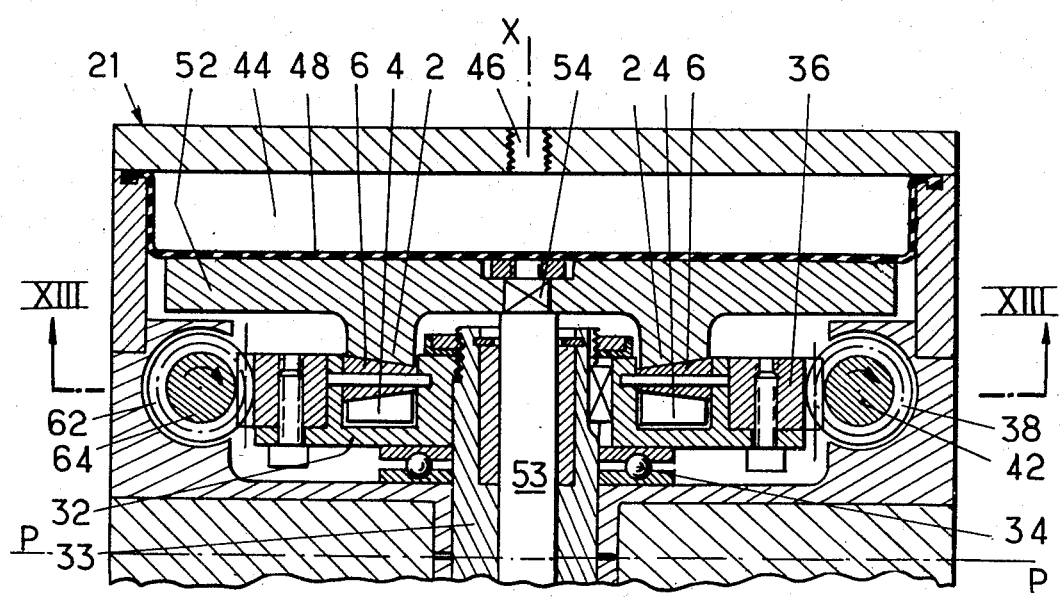
FIG. 11, similar to FIG. 7, is a view in axial section of a step by step device with four output shafts according to the present invention.
Figure 19:
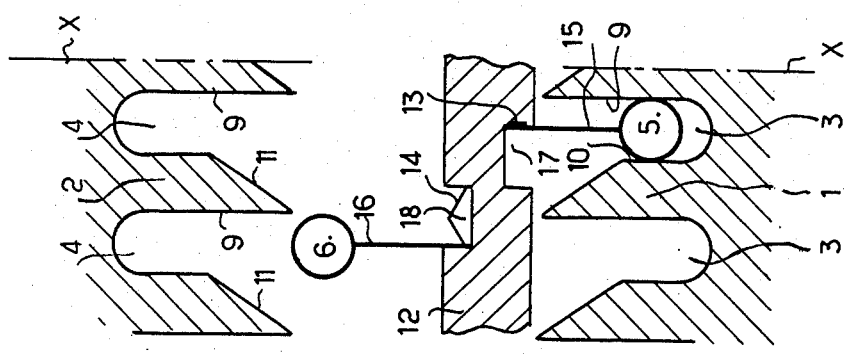
FIGS. 16, 17, 18 and 19, similar to FIGS. 12 to 15, illustrate similarly a step by step motor-brake device according to the present invention.
Figure 18:
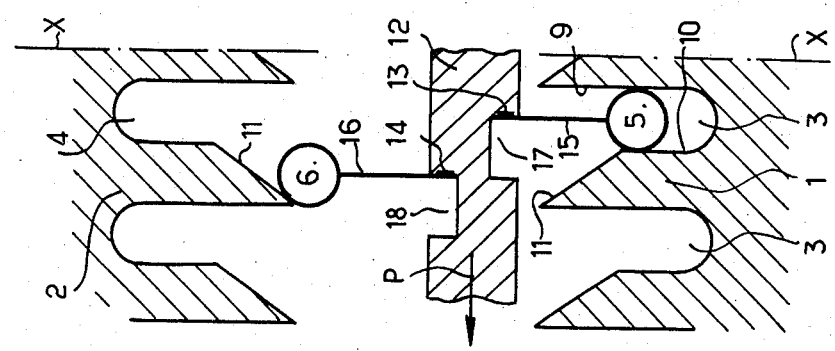
Figure 17:
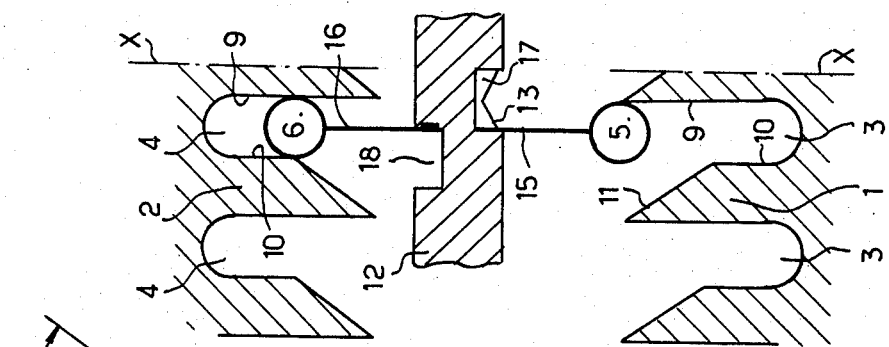
Figure 16:
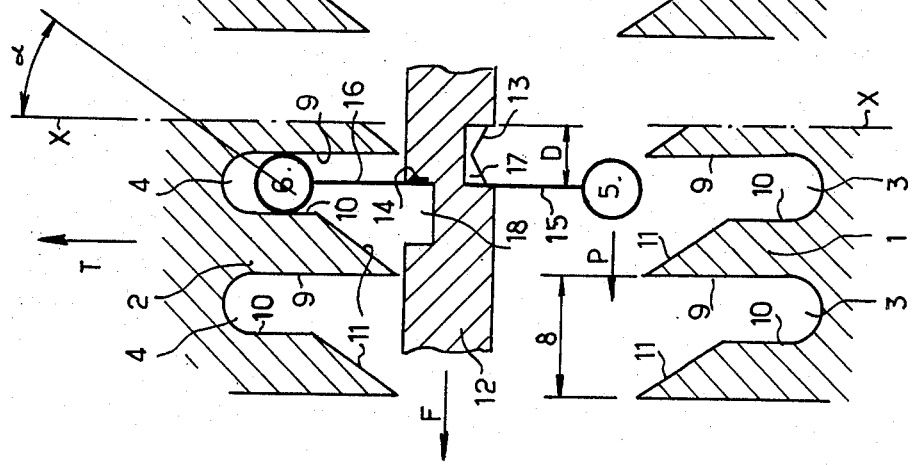

FIG. 11 shows, in axial section, a step by step pneumatic motor according to the present invention, provided with four output shafts: each toothed annular ring 35 and 36, which has the form of an irreversible screw, meshes with gear wheels 37 and 61, 38 and 62 fixed on output shafts 41 and 63, 42 and 64. Each toothed annular ring 35, 36 may comprise two output shafts with different reduction and rotating in the same direction. Of course, the steps of the teeth of gear wheels 37 and 61, 38 and 62 may be different and, according to the invention, this motor (pneumatic or other) thus drives step by step outputs, in pairs with the same step and in opposite directions and with different steps from one pair to the other pair.

The left hand surface of annular rings 1 and 2 with cavities 3 and 4 may be formed by milling, by grinding a milling cutter to the shape of the frusto-conical roller and to its dimensions (taking into account the tolerances and clearances); according to the invention, these annular rings are preferably obtained by die stamping or by forging.

The weight of the sliding assembly is sufficiently small for the friction to maintain this assembly in the end of travel position where it has been sent by a pneumatic control pulse. This assembly may however be provided with a holding device, such as a reversible frusto-conical spring or other equivalent, for questions of choice or expediency, for example in the case of heavy vibration and/or acceleration.

FIGS. 12, 13, 14 and 15 show a part of annular rings 1 and 2 of another embodiment, their cylindrical surface being split along a generatrix parallel to the general axis XX and developed flat; their teeth are symmetrical and symmetrically placed facing each other; their cavities 3 and 4 are in the shape of an asymmetrical V, i.e. with one leg 9 parallel to axis XX and with one leg with one part 10 parallel to axis XX and one part 11 forming an angle α with axis XX. The rotating assembly 12 comprises two sets of frusto-conical rollers 5 and 6 (the figures only show a single roller 5 and a single roller 6); the rollers of the same set are held in a cage 15 or 16 (shown symbolically by a line), movable in a housing 17 or 18 of the rotating assembly 12; these two housings 17 and 18 are staggered by half a step 7 in relation to each other, each of them has a length D at least equal to half a step 7 and is provided with a spring 13 or 14 pushing the cage 15 or 16 and rollers 5 or 6 forwards in the direction of rotation of the rotating assembly 12 (from left to right in FIGS. 12 to 15, arrow P).

FIG. 12 shows the device in one of its two rest states: roller 6 is at the bottom of a cavity 4 of annular ring 2, roller 5 is free, spring 14 holds roller 6 forward and at distance D from the rotating assembly 12. When the rotating assembly 12 moves down or when annular rings 1 and 2 move up (arrow T), roller 6 rolls along leg 9, parallel to axis XX, and the rotating assembly 12 does not rotate. Then (FIG. 13) roller 5 comes to bear on the oblique part 11 of a cavity 3 of annular ring 1: this causes the rotating assembly 12 to advance by half a step 7, while compressing (FIG. 14) spring 14 of roller 6. Finally, roller 5 moves down between the right hand part 10 and leg 9 of cavity 3, roller 6 leaving cavity 4: which releases its spring 14 (FIG. 15); this is the other rest state of the device.

It will be noted, in FIGS. 12 to 15, that the rotating assembly 12 can in no case move back inopportunely. It could on the contrary advance by half a step under the action of an outside force which would compress spring 13 or 14 of a set of frusto-conical rollers. To prevent this advance, the present invention provides a free wheel without clearance on the output shaft.

FIGS. 16 to 19 are similar to FIGS. 12 to 15, but concern a brake device according to the present invention; the rotating assembly is subjected to a driving torque (arrow F, from right to left in FIGS. 16 to 19) and rotates in the direction imposed by this torque (arrow P, from right to left). We find again in FIGS. 16 to 19 the same parts, with the same references, as in FIGS. 12 to 15; however, as already mentioned, springs 13 and 14 are reversed, and now they push the cages 15 and 16 leftwards in the figures, in the direction of arrows F and P.

Figure 20:
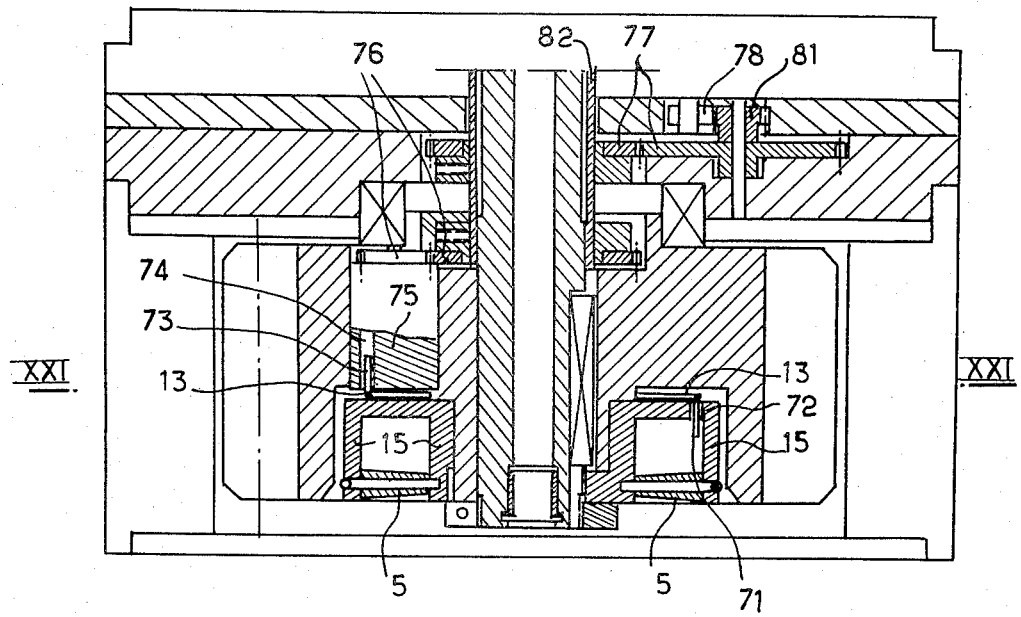
FIGS. 20 and 21 are sectional views showing a reversible spring, and its control, according to the present invention.
Figure 21:
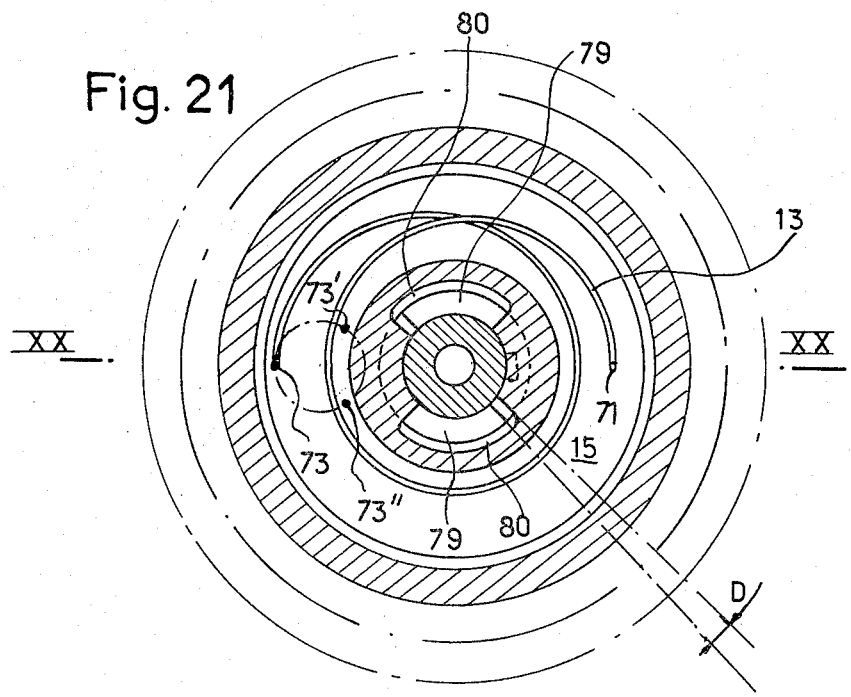

FIGS. 20 and 21 show an embodiment of the reversible spring 13 (or 14) of the present invention: in this embodiment, the reversible spring 13 is of the spiral type, with one and a half turns, as can be seen in FIG. 21; at one of its ends, a turned down portion 71 is housed in a bore 72 in cage 15 for rollers 5; at the other end, a turned down portion 73 is housed in a bore 74 in a sleeve 75. This sleeve 75 may rotate on itself from the neutral position (shown in FIGS. 20 and 21) under the action of a two-stage-counter-gearing 76 and 77 (FIG. 20), this latter being controlled from the outside by a rack 78 which meshes with pinion 81, itself intercoupled with stage 77. Rack 78 transmits the movement of rotation to stage 77 which is intercoupled with a tube 82 coaxial with stage 76 which transmits the movement to sleeve 75. By operating this rack 78 in one direction or in the other, the sleeve 75 tightens or releases reversible spring 13, of which it brings the folded back portion 73 into one of two positions 73' or 73'' (FIG. 21), this position being maintained by the action of the spring itself. As already mentioned, the cage 15 for rollers 5 is mounted on the rotating assembly 12 with an angular clearance D provided (FIG. 21) between studs 79 and notches 80; the same goes for the other cage 16 for rollers 6; it should be stated in this respect that one rack 98 having a single pinion 81 and a single stage 79 drive two stages 76.

Figure 22:
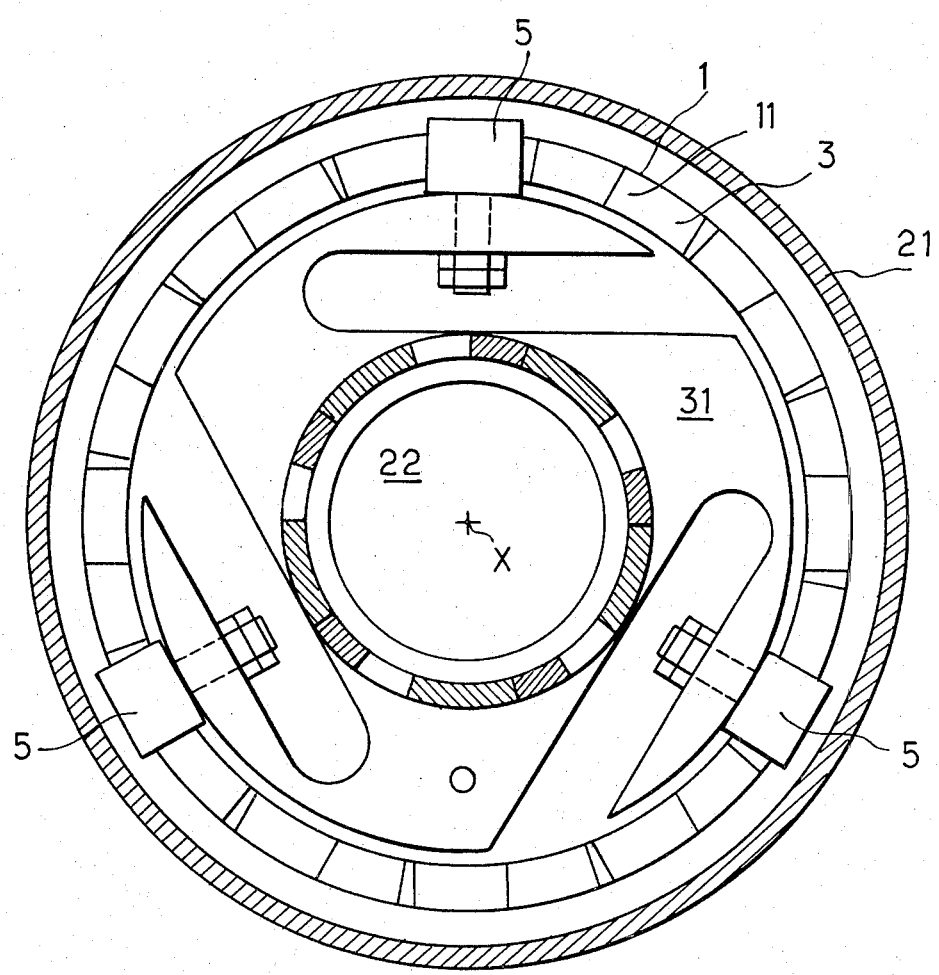
FIG. 22 is a sectional view perpendicular to the axis.
Figure 23:
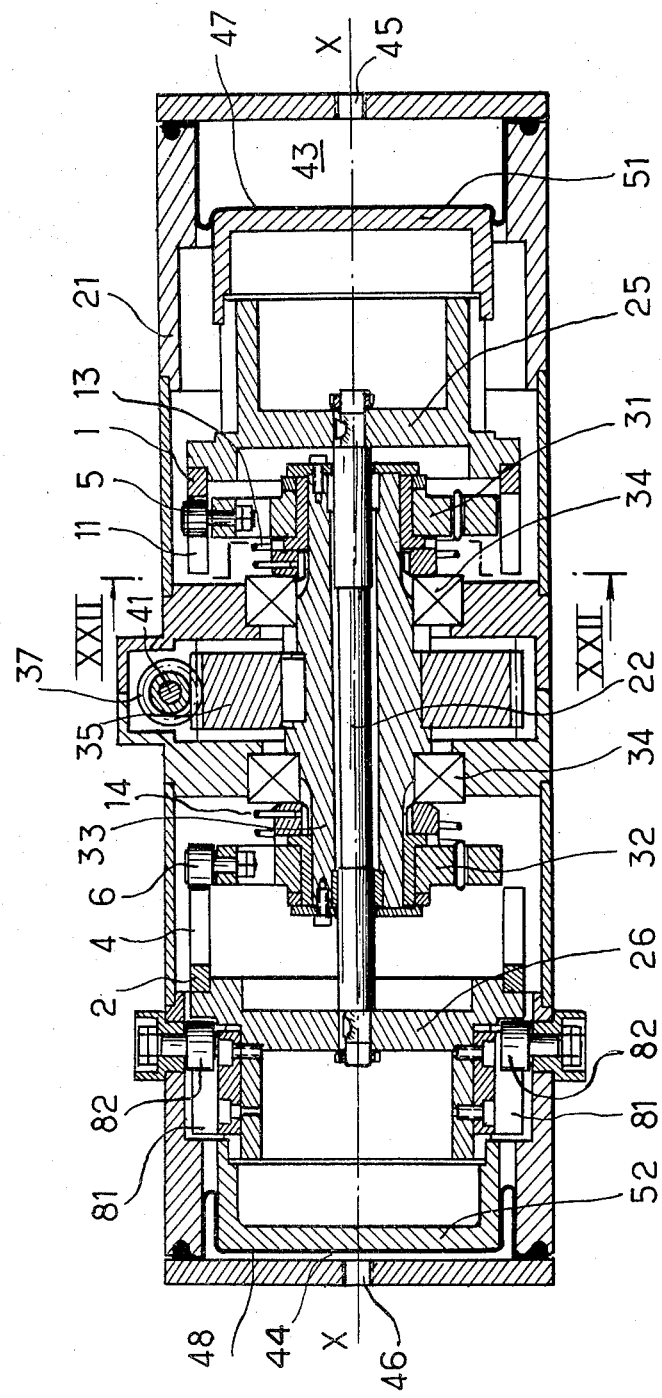
FIG. 23 is a view in axial section of an advantageous embodiment of the step by step motor-brake device according to the present invention.

FIGS. 22 and 23 show an advantageous embodiment of a step by step device according to the present invention, this embodiment having given in operation excellent results. We find again in these two figures the same parts, with of course the same references. In a casing 21, having a general cylindrical shape about axis XX, there slides shaft 22, having axis XX, carrying two pistons 51 and 52, for which the casing 21, with two resilient membranes 47 and 48, forms two pneumatic cylinders 43 and 44, with pneumatic connections 45 and 46; shaft 22 carries said pistons 51 and 52 by means of two discs 25 and 26, provided with longitudinal notches 81 in which travel rollers 82 which facilitate and guide the sliding (without rotation) of shaft 22; discs 25 and 26 carry annular rings 1 and 2 with cavities 3 and 4. The rotating assembly comprises a sleeve 33, rotating in casing 21 on thrust-bearings 34 and carrying an irreversible gear wheel 35 meshing with a pinion 37 firmly fixed on output shaft 41 mounted in casing 21; on sleeve 33 are mounted two discs 31 and 32; each disc 31 or 32 is mounted on sleeve 33 with an angular clearance D at least equal to half a step 7 and is provided with a spiral spring 13 or 14 operating in traction or in compression (in this example, spring 13 or 14 are not reversible, but of course, they could be reversible as already described with a reference to FIGS. 20 and 21); each disc 31 or 32 carries three rollers 5 or 6, which are cylindrical: consequently, the sides 11 (oblique in relation to axis XX) of cavities 3 and 4 are helicoidal surfaces.

It follows from the preceding description that, whatever the embodiments and modes of application adopted, there is provided according to the invention, actuating devices which present important advantages the principal ones of which having been mentioned above and which will appear, as well as other advantages, during the use of the devices of the invention.

As it follows from what has gone before, the invention is in no wise limited to those of its embodiments and modes of application which have been more explicitely described; it embraces on the contrary all variations thereof which may come to the mind of a man skilled in the art, without departing from the spirit or from the scope of the present invention.

What is claimed is:

1. A step by step motor and/or brake device by controlled translation, characterized in that it comprises, in a casing having a shape generally cylindrical about an axis XX, a sliding assembly, comprising a shaft carrying two pistons for the pneumatic control of its reciprocal sliding, with means for guiding this sliding, and carrying two symmetrical annular rings, provided with identical and consecutive cavities whose periphery is in the shape of an asymmetrical V with one leg parallel to said axis and with the other leg comprising an external part forming with said axis an angle less than about 60°, and preferably equal to about 30°, and an internal part parallel to said axis, said cavities of one annular ring being staggered angularly in relation to the other annular ring, by half of the width of a cavity, and a rotating assembly, comprising a sleeve rotating in said casing and carrying an irreversible gear wheel meshing with an output pinion, and on said sleeve two discs, each disc being mounted on said sleeve with an angular clearance at least equal to half of the width of said cavities and with a spring taking up this angular clearance, each disc comprising several, particularly three, cylindrical rollers.

2. A device according to claim 1, characterized in that each of the two said springs is reversible under the action of a control.

3. A step by step motor and/or brake device for effecting a step by step rotational movement in response to a controlled translation, comprising first and second motive means disposed substantially coaxially about the same shaft, said first motive means or said second motive means being slidable reciprocally along said shaft in said controlled translation and the other of said first and second motive means being secured from sliding along said shaft, said first motive means or said second motive means being rotatable about said shaft for supplying said step by step rotational movement and the other of said first and second motive means being secured against rotation about said shaft, said first motive means or said second motive means comprising at least one roller whose axis is perpendicular to said shaft and the other of said first and second motive means comprising at least one annular ring having a face perpendicular to said shaft, said face being provided with at least one cavity having an inclined surface for cooperation with said roller, said controlled translation resulting in said roller rolling over at least a portion of said inclined surface of said cavity to effect said rotational movement.

4. The device according to claim 3, wherein the surface of said at least one cavity is the envelope of a volume substantially equal to said roller.

5. The device according to claim 4, wherein said cavity is configured such that in rolling over said cavity said roller would roll over a cylindrical line which forms a generally V-shaped hollow.

6. The device according to claim 5, wherein said generally V-shaped hollow is symmetrical.

7. The device according to claim 5, wherein said generally V-shaped hollow is asymmetrical.

8. The device according to claim 6 or 7, wherein said controlled translation brings said cavity and said roller into mutual contact and then causes said roller to roll over said cavity to the bottom of the V-shaped hollow to effect said rotational movement.

9. The device according to claim 3, wherein said at least one roller is cylindrical.

10. The device according to claim 3, wherein said at least one roller is frusto-conical in shape, the apex of the cone being on said axis.

11. The device according to claim 3, wherein the annular ring motive means comprises two annular rings of the type described mounted on said shaft, the faces of said annular rings which are perpendicular to said shaft and provided with said at least one cavity being in opposed, spaced relationship, and wherein said motive means comprising said at least one roller is mounted on said shaft intermediate said opposed, spaced faces.

12. The device according to claim 11, wherein the motive means comprising said two annular rings is mounted for sliding along said shaft and the motive means comprising at least one roller is mounted for rotation about said shaft.

13. The device according to claim 12, wherein the opposed faces of the two annular rings are each provided with a plurality of consecutive cavities like said at least one cavity, the cavities being configured such that the roller, in rolling over each of said cavities, would roll over a cylindrical line which forms a generally V-shaped hollow, the V-shaped hollow being asymmetrical with one leg parallel to said shaft and with at least a portion of the other leg forming with said shaft an angle less than about 60°.

14. The device according to claim 13, wherein said other leg has an external part forming with said shaft an angle of less than about 60° and an internal part parallel to said shaft.

15. The device according to claim 13, wherein the motive means mounted for rotation comprises two sets of identical and radially equidistant rollers, the number of rollers per set being equal to or a sub-multiple of the number of cavities provided in the face of the associated annular ring.

16. The device according to claim 15, wherein an angular stagger of half a cavity is provided between two sets of rollers.

17. The device according to claim 15, wherein an angular stagger of half a cavity is provided between the two annular rings.

18. The device according to claim 15, wherein part of an angular stagger of half a cavity is provided between the two annular rings and the complement between the two sets of rollers.

19. The device according to claim 16, 17 or 18, wherein control means are provided for reciprocally sliding the sliding motive means and wherein output means are provided for the rotation of the roller motive means.

20. The device according to claim 19, wherein a casing having a cylindrical square-based shape is provided about said shaft, wherein said control means comprises two discs which carry the two annular rings and which are intercoupled by said shaft with means for preventing rotation of the sliding motive means, and wherein the rotating motive means comprises two discs intercoupled by a sleeve which surrounds said shaft and rotates in said casing on thrust bearings, the two discs of said rotating motive means each carrying one of said two sets of rollers and a toothed annular ring having the form of an irreversible screw meshing with a gear wheel which is integral with an output drive member of said output means.

21. The device according to claim 20, wherein said control means includes push rods connected to the ends of said shaft, the push rods being located outside the casing.

22. The device according to claim 20, wherein said control means includes a pneumatic cylinder formed at each end of the case with a resilient membrane from which the discs of said control means serve as pistons.

23. The device according to claim 22, wherein the pneumatic cylinders, with the resilient membranes, and the piston discs have a diameter greater than that of the central part of the casing.

24. The device according to claim 20, wherein the casing contains, as control means, an electric motor system.

25. The device according to claim 24, wherein said electrical motor system comprises a pair of solenoids housed symmetrically in the central part of the casing about said shaft and a soft iron ring mounted on said shaft.

26. The device according to claim 20, wherein each of the output drive members is an output shaft.

27. The device according to claim 26, wherein on each output shaft there is provided a free wheel without clearance.

28. The device according to claim 20, wherein means in the form of reversible frusto-conical springs are provided for holding the sliding motive means in its end of travel positions.

* * * * *